(12) United States Patent
Chiu et al.

(10) Patent No.: US 11,681,089 B2
(45) Date of Patent: Jun. 20, 2023

(54) OPTICAL FILM, BACKLIGHT MODULE AND DISPLAY DEVICE

(71) Applicants: Radiant(Guangzhou) Opto-Electronics Co., Ltd, Guangdong (CN); Radiant Opto-Electronics Corporation, Kaohsiung (TW)

(72) Inventors: Yi-Jen Chiu, Kaohsiung (TW); Sung-Fu Wu, Kaohsiung (TW); Ying-Ting Chen, Kaohsiung (TW)

(73) Assignees: RADIANT(GUANGZHOU) OPTO-ELECTRONICS CO., LTD, Guangdong (CN); RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 17/658,258

(22) Filed: Apr. 7, 2022

(65) Prior Publication Data

US 2022/0308283 A1    Sep. 29, 2022

Related U.S. Application Data

(63) Continuation of application No. PCT/CN2021/083226, filed on Mar. 26, 2021.

(51) Int. Cl.
    *F21V 8/00*    (2006.01)
(52) U.S. Cl.
    CPC ........... *G02B 6/0065* (2013.01); *G02B 6/005* (2013.01); *G02B 6/0086* (2013.01)

(58) Field of Classification Search
    CPC ..... G02B 6/0065; G02B 6/005; G02B 6/0086
    See application file for complete search history.

(56) References Cited

U.S. PATENT DOCUMENTS

| 2003/0133207 | A1* | 7/2003 | Minami | G02B 5/20 |
| | | | | 359/885 |
| 2009/0033827 | A1* | 2/2009 | Chen | G02F 1/1335 |
| | | | | 362/633 |
| 2016/0370641 | A1* | 12/2016 | Hirasawa | G02F 1/133308 |
| 2017/0139098 | A1* | 5/2017 | Zeng | G02B 6/005 |

FOREIGN PATENT DOCUMENTS

| CN | 201764409 U | 3/2011 |
| CN | 202125822 U | 1/2012 |
| CN | 103982869 A | 8/2014 |
| JP | 2009075545 A | 4/2009 |
| JP | 2013175367 A | 9/2013 |
| TW | 200720766 A | 6/2007 |
| TW | I457661 B | 10/2014 |

(Continued)

*Primary Examiner* — Donald L Raleigh
(74) *Attorney, Agent, or Firm* — CKC & Partners Co., LLC (57) ABSTRACT

An optical film is disclosed. The optical film is divided into a main body and two extending portions arranged along a second direction by two imaginary lines which are extended along a first direction and parallel to each other, wherein the second direction is substantially perpendicular to the first direction. The main body is located between the two extending portions. Each of the extending portions has an abutting edge. A first length W0 of the main body along the first direction is greater than a second length W1 of the abutting edge along the first direction.

15 Claims, 8 Drawing Sheets

(56) References Cited

FOREIGN PATENT DOCUMENTS

| TW | I628476 | B | 7/2018 |
| TW | I661246 | B | 6/2019 |
| TW | I662328 | B | 6/2019 |
| TW | I676844 | B | 11/2019 |
| TW | I681231 | B | 1/2020 |
| TW | I682223 | B | 1/2020 |
| TW | I696871 | B | 6/2020 |
| TW | M612751 | U | 6/2021 |

* cited by examiner

OPTICAL FILM, BACKLIGHT MODULE AND DISPLAY DEVICE

RELATED APPLICATION

This application is a continuation application of International Application No. PCT/CN2021/083226 filed on Mar. 26, 2021, which is incorporated herein by reference.

BACKGROUND

Field of Invention

The present invention relates to an optical film, a backlight module, and a display device, and more particularly, to an optical film useful for applying in a narrow frame design, and a backlight module and a display device including the optical film.

Description of Related Art

With the advancement of technology, electronic equipment equipped with display devices, such as mobile phones, laptops, etc., are indispensable in modern life. To meet the customers' demand for appearance and light weight in the design of display devices, a narrow frame has become a popular trend.

Figure 1:
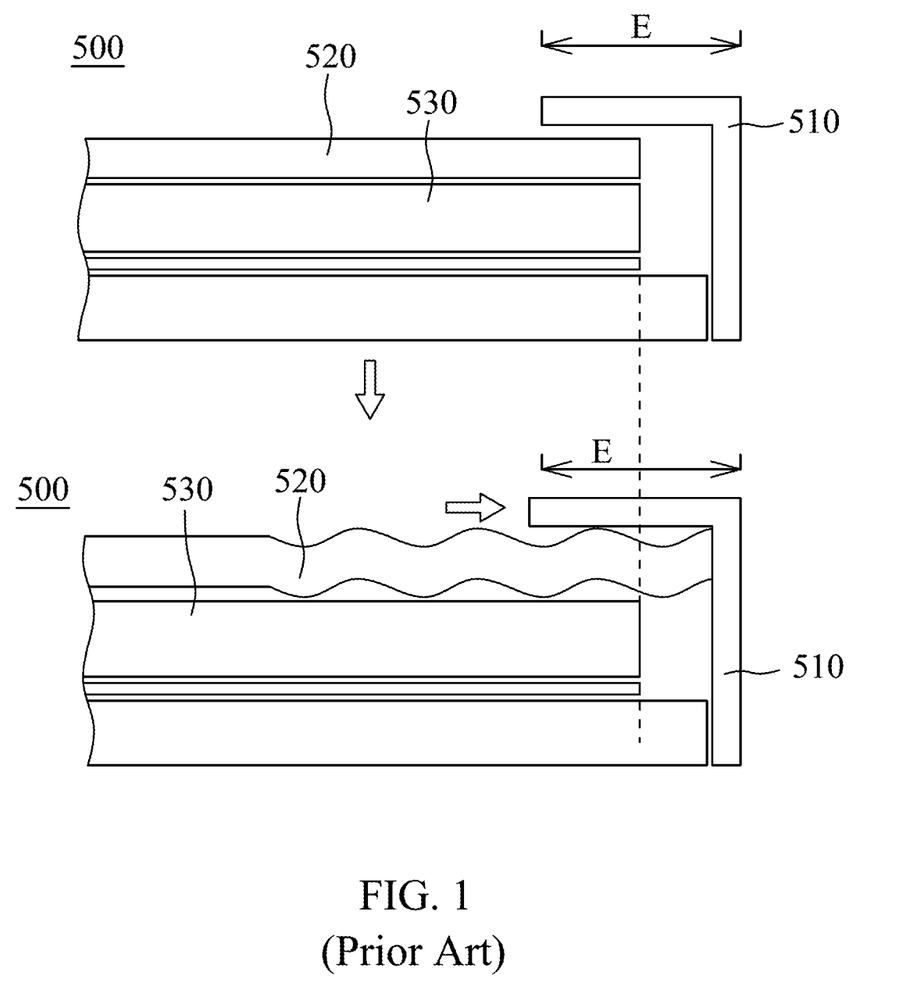
FIG. 1 is a schematic diagram of a change of a backlight module of a prior art in thermal expansion.
Figure 2:
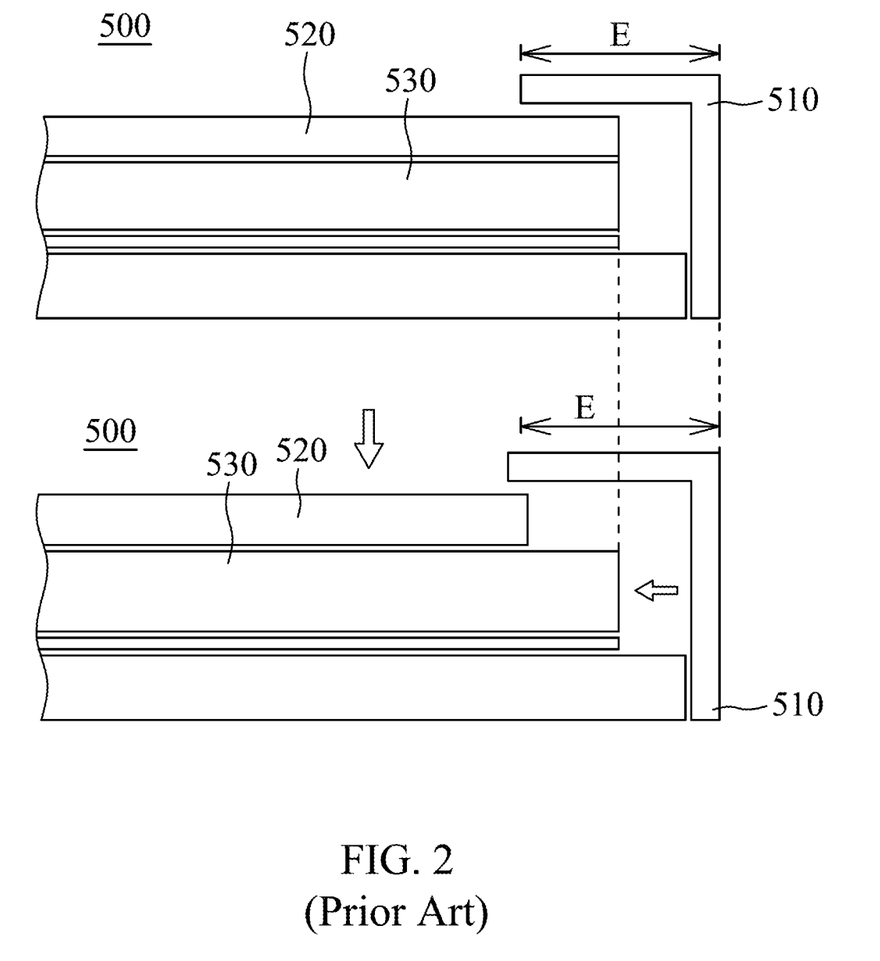
FIG. 2 is a schematic diagram showing a change of the backlight module of the prior art in cold contraction.

However, the volume of a backlight module may expand or contract under the influence of temperature-changing. Referring to FIG. 1, FIG. 1 is a schematic diagram of a change of a backlight module 500 of a prior art in thermal expansion, wherein an upper half and a lower half of the schematic diagram are schematic diagrams of the backlight module 500 in room temperature and high temperature respectively. The backlight module 500 includes a frame 510, an optical film 520, and an optical plate 530. As shown in FIG. 1, during thermal expansion situation, the optical film 520 expands to the extent that its side edges are squeezed by the frame 510, at the same time, the optical film 520 is also limited by the frame 510. As a result, a portion of the optical film 520 where pressed by the frame 510 occurs waving or wrinkles, in which the optical film 520 deforms permanently due to an excessive structural stress. Refer to FIG. 2, which is a schematic diagram showing the change of the backlight module 500 of the prior art in cold contraction, in which an upper half and a lower half are schematic diagrams of the backlight module 500 in room temperature and low temperature respectively. As shown in FIG. 2, during cold contraction situation, compared to the room temperature situation, an area of the optical film 520 pressed by the frame 510 is smaller due to the cold contraction, such that the optical film 520 would easily escape from the pressing of the frame 510 and jump out of the frame 510. In order to solve the jumping-out problem of the optical film 520, it still is disadvantageous to a narrow frame design if increasing the width of the frame 510 (a width E shown in FIG. 2).

SUMMARY

The objection of the present invention is to provide an optical film, a backlight module, and a display device to solve the problems described above.

According to one embodiment of the present invention, an optical film is provided. The optical film is divided into a main body and two extending portions arranged along a second direction by two imaginary lines, which are extended along a first direction and parallel to each other, wherein the second direction is substantially perpendicular to the first direction. The main body is located between the two extending portions. Each of the extending portions has an abutting edge. A first length W0 of the main body along the first direction is greater than a second length W1 of the abutting edge along the first direction.

According to another embodiment of the present invention, a backlight module is provided, and the backlight module includes a frame, an optical plate, a light source, and the said optical film. The frame includes two first frame portions opposite to each other. The optical plate is disposed in the frame, and the optical plate includes a light emitting surface, a bottom surface, and a side surface. The bottom surface is opposite to the light emitting surface. The side surface is connected between the light emitting surface and the bottom surface. The light source is disposed on the bottom surface or the side surface of the optical panel. The optical film is disposed in the frame and set on the light emitting surface.

According to still another embodiment of the present invention, a display device is provided. The display device includes the said backlight module and a display panel, and the display panel is disposed over the backlight module.

According to still another embodiment of the present invention, a backlight module is provided. The backlight module includes a frame, an optical plate, a light source, and an optical film. The frame includes two first frame portions opposite to each other, and each of the first frame portions extends along a first direction. The optical plate is disposed in the frame, and the optical plate includes a light emitting surface, a bottom surface, and a side surface. The bottom surface is opposite to the light emitting surface, and the side surface is connected between the light emitting surface and the bottom surface. The light source is disposed on the bottom surface or the side surface of optical plate. The optical film is disposed in the frame and set on the light emitting surface, and the optical film includes two abutting edges extending along the first direction and parallel to each other. There is an expansion space above the optical film, and the expansion space has a height along a vertical direction. In an expansion temperature, each of the abutting edges abuts against one of the first frame portions, and the height of the expansion space is configured to allow the optical film to be arched in an arc along the vertical direction.

According to still another embodiment of the present invention, a display device is provided. The display device includes the said backlight module and a display panel, and the display panel is disposed over the backlight module. The expansion space is located between the display panel and the optical film, and the height of the expansion space is a distance between the display panel and the optical film in the vertical direction.

Compared with the prior art, it provides extending portions on an optical film in the present invention, wherein the length of each abutting edge of the extending portions extending along a first direction is smaller than a length of a main body along the first direction, such that it prevents the optical film from interfering with a frame at corners or jumping out of the frame when contracting, and it is not necessary to increase a width of the frame, which is beneficial to a narrow frame design. On the other hand, the optical film is arched in an arc in a vertical direction by arranging an expansion space, thereby preventing the optical film from permanent deformation, such as wavy deformation or wrinkle, etc., due to the insufficient expansion space.

DETAILED DESCRIPTION

The forgoing and other technical contents, features, and effects of the present invention will be clearly presented in the following detailed description of preferred embodiments with reference to the accompanying drawings. Directional terms, such as "up," "down," "left," "right," "front," "back," and the like, mentioned in the following embodiments are merely for referring to directions of the accompanying drawings. Accordingly, the directional terms used herein are intended to illustrate, but not to limit the present invention. Further, in the following embodiments, the same or similar reference numbers are used to refer to the same or similar elements.

In the present invention, two elements being parallel or substantially parallel indicates that there is an included angle between the two elements, and the included angle is 0°±10°, preferably 0°±5°, or the included angle is 180°±10°, preferably 180°±5°. In the present invention, two elements being perpendicular or substantially perpendicular to each other indicates that there is an included angle between the two elements, and the included angle is 90°±10°, preferably 90°±5°.

In the present invention, a backlight module may be used to provide a liquid crystal display (LCD) panel with a light source. Each element in the backlight module includes a bottom surface and a top surface, and the definition of the bottom surface and the top surface is based on the LCD panel as a reference, in which each element takes a surface away from the LCD panel as the bottom surface, and a surface facing the LCD panel as the top surface. In the present invention, an element being disposed over another element indicates that the element is disposed on or over a top surface of the another element.

In the present invention, a predetermined temperature may be room temperature, such as but not limited to 25° C. The predetermined temperature in the subsequent description may be also referred to as a first temperature. A contraction temperature, such as but not limited to a lowest temperature that a backlight module and/or a display device can withstand, or a specified temperature in a specified challenge test, such as but not limited to −40° C., is lower than the predetermined temperature. The contraction temperature in the subsequent description may be also referred to as a second temperature. A expansion temperature, such as but not limited to a highest temperature that a backlight module and/or a display device can withstand, or a specified temperature in a specified challenge test, such as but not limited to 95° C., is higher than the predetermined temperature. The expansion temperature in the subsequent description may be also referred to as a third temperature.

Figure 3:
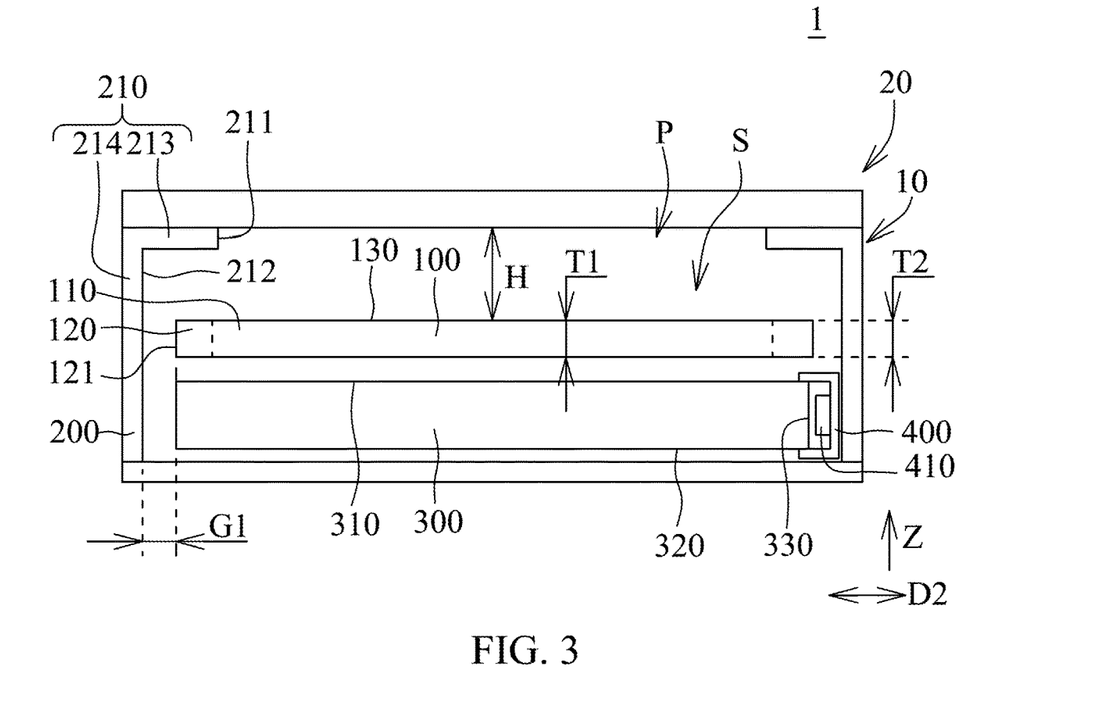
FIG. 3 is a schematic cross-sectional view of a display device in a predetermined temperature according to one embodiment of the present invention.

Refer to FIG. 3, which is a schematic cross-sectional view of a display device 1 in a predetermined temperature according to one embodiment of the present invention. The display device 1 includes a backlight module 10 and a display panel 20, and the display panel 20 is disposed over the backlight module 10. The backlight module 10 is used to provide light to the display panel 20, and the display panel 20 may be an LCD panel.

The backlight module 10 includes a frame 200, an optical film 100, an optical plate 300, and a light source 400. The optical plate 300 is disposed in the frame 200, and the optical plate 300 includes a light emitting surface 310, a bottom surface 320, and a side surface 330, wherein the bottom surface 320 is opposite to the light emitting surface 310, and the side surface 330 is connected between the light emitting surface 310 and the bottom surface 320. The light source 400 is disposed on the bottom surface 320 or the side surface 330 of the optical plate 300. That is, the backlight module 10 may be a direct type or edge type backlight module. The light source 400 is disposed on the side surface 330, and the backlight module 10 is an edge type backlight module as an example herein. The light source 400 may be selectively disposed on the side surface parallel to a first direction D1 or a second direction D2, which is not limited to the present embodiment. The light source 400 may be, but not limited to, a cold cathode fluorescent lamp (CCFL) or a LED light bar. The LED light bar is used as an example herein, and the LED light bar includes a plurality of LEDs 410. The backlight module 10 may include other optical films or other components according to actual demands.

The optical film 100 is disposed in the frame 200 and set on the light emitting surface 310 of the optical plate 300. Also refer to FIG. 7, which is a plan view of the optical film 100 in FIG. 3. The optical film 100 is divided into a main body 110 and two extending portions 120 arranged along the second direction D2 by two imaginary lines L, which extend along the first direction D1 and are parallel to each other. For example, the main body 110 corresponds to a part in the display panel 20 that can be used to display images, and the part is substantially a complete rectangle. The two extending portions 120 are two parts extending towards the second direction D2 relative to the rectangular main body 110. The second direction D2 is substantially perpendicular to the first direction D1. The main body 110 is between the two extending portions 120, and each of the extending portions 120 includes an abutting edge 121. In other embodiments, when the backlight module 10 further includes other optical films, the optical film 100 with the abutting edges 121 is closer to the display panel 20 than the other optical films.

Figure 5:
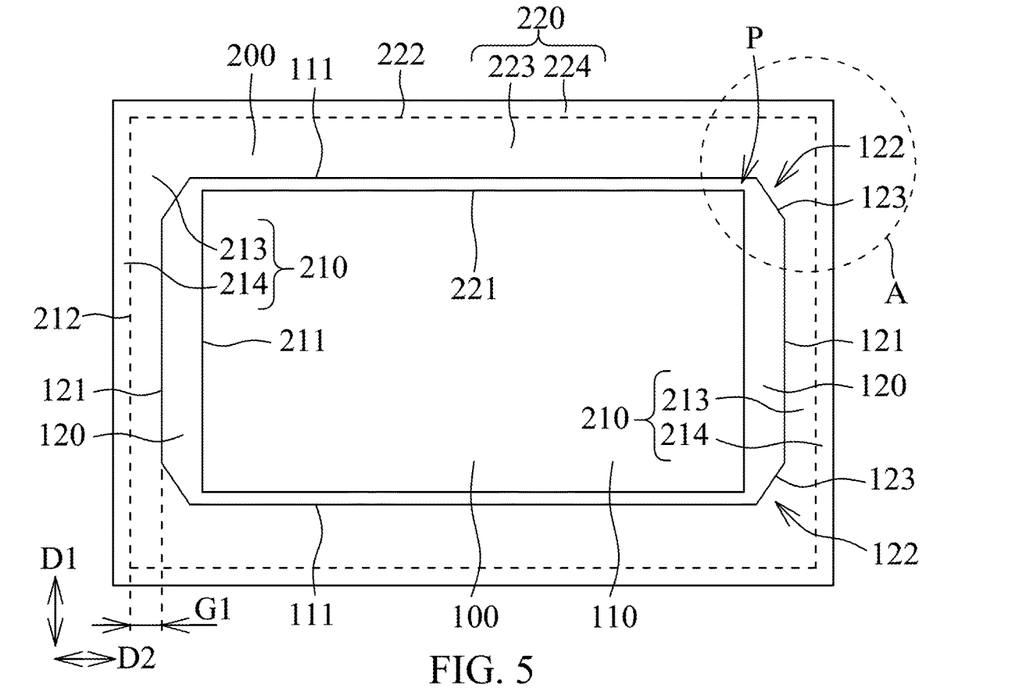
FIG. 5 is a schematic top view of the frame and the optical film shown in FIG. 3.

Also refer to FIG. 5, which is a schematic top view of the frame 200 and the optical film 100 in FIG. 3. In order to clearly show the optical film 100, the optical film 100 is illustrated in solid lines instead of dash lines herein. In the present embodiment, the light emitting surface 130 of the optical film 100 is covered by the frame 200. The frame 200 is a front frame, and the frame 200 includes two first frame portions 210 opposite to each other. The two first frame portions 210 of the frame 200 and the two extending portions 120 of the optical film 100 all extend along the first direction D1. In the present embodiment, the first frame portion 210 includes a first horizontal wall 213 and a first vertical wall 214 connected to each other, wherein the first vertical wall 214 is parallel to a vertical direction Z, and the first horizontal wall 213 extends inward from a top of the first vertical wall 214 along the second direction D2. More specifically, the light emitting surface 130 of the optical film 100 is covered by the first horizontal wall 213, and the optical film 100 or the other optical films may not jump out from the frame 200 due to the mutual interference between the first horizontal wall 213 and the extending portions 120 of the optical film 100. A surface of the first vertical wall 214 of the first frame portion 210 which facing the optical film 100 is a first surface 212, and an end of the first horizontal wall 213 of the first frame portion 210 which opposite to the first vertical wall 214 is a first end face 211.

In a predetermined temperature, there is a first gap G1 between each of the abutting edges 121 and the first frame portion 210. In one embodiment, the first gap G1 is a gap that exists between the first surface 212 of the first frame portion 210 and the abutting edge 121 of the optical film 100 in the predetermined temperature. There is an expansion space S above the optical film 100, and the expansion space S has a height H along the vertical direction Z. In one embodiment, the expansion space S is a space that exists between the first horizontal walls 213 of the first frame portions 210 and the optical film 100 in the predetermined temperature.

Figure 4:
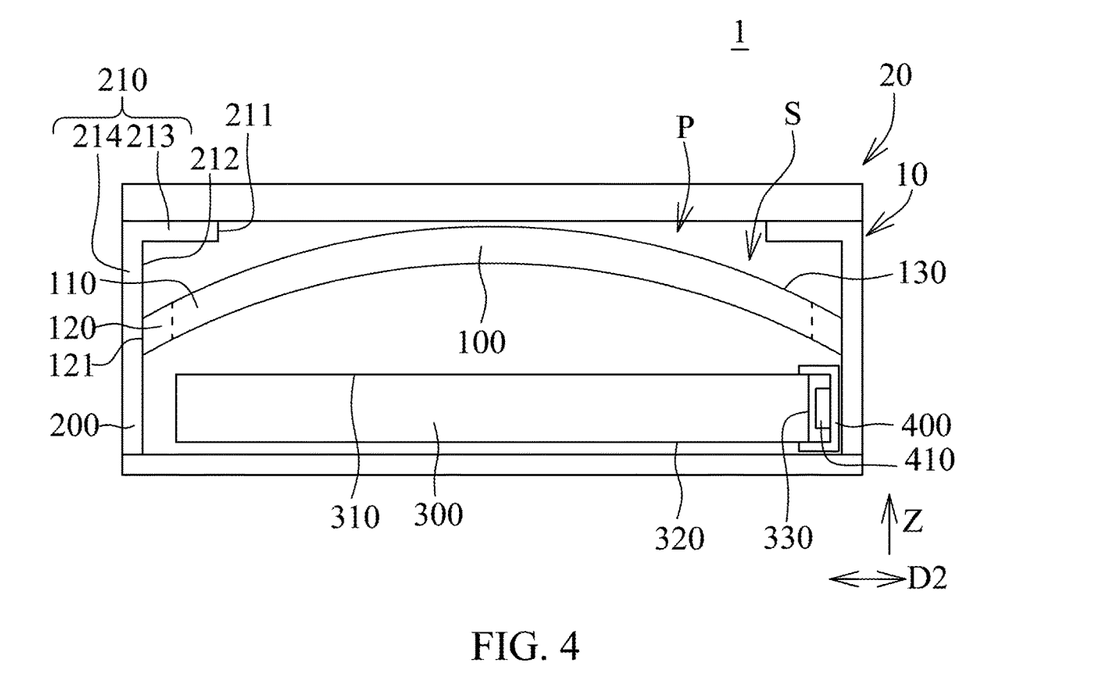
FIG. 4 is a schematic cross-sectional view of the display device shown in FIG. 3 in an expansion temperature.

Also refer to FIG. 4, which is a schematic cross-sectional view of the display device 1 in FIG. 3 in an expansion temperature. In the expansion temperature, the optical film 100 expands, such that the abutting edges 121 both abut against the first surfaces 212 of the first frame portions 210. In other words, in the expansion temperature, the first gap G1 no longer exists, the abutting edges 121 both abut against the first surfaces 212 of the first frame portions 210, an expansion length of the optical film 100 along the second direction D2 has exceeded the first gap G1, and the optical film 100 is further arched in an arc along the vertical direction Z through the configuration of the height H of the expansion space S. Specifically, the optical film 100 is arched in a unidirectional arc along the vertical direction Z, so as to reduce irreversible wavy deformation or wrinkle of the optical film 100. When the ambient temperature returns to the predetermined temperature, the length of the optical film 100 along the second direction D2 also returns to the length in the predetermined temperature, and the first gap G1 is formed between each of the abutting edges 121 of the optical film 100 and the first surface 212 of the first frame portion 210 again. With the configuration of the expansion space S, when the optical film 100 expands, in addition to extending along the second direction D2 to reduce the size of the first gap G1, the optical film 100 can also be arched along the vertical direction Z, thereby benefiting the narrow frame design. By configuring the expansion space S with sufficient height H, a permanent deformation of the optical film 100, such as wavy deformation and wrinkle, which occurred due to the absence of the expansion space in the vertical direction Z, can be prevented, which is beneficial for the optical film 100 to contract to its original size and return to a flat state when the optical film 100 returns to the predetermined temperature.

In one embodiment, a first length W0 of the main body 110 of the optical film 100 extending along the first direction D1 is greater than a second length W1 of the abutting edges 121 extending along the first direction D1. The permanent deformation, such as wrinkle, etc., which occurred due to interference between corners of the optical film 100 and the frame 200 when the optical film 100 expands, can be prevented. It should be noted that, referring to FIG. 7, the first length W0 of the main body 110 and the second length W1 of the abutting edge 121 may satisfy the following condition: W1≤⅔ W0. In this way, the abutting edges 121 of the optical film 100 have the second length W1 which is long enough to abut against the first vertical wall 214 of the first frame portion 210, so as to provide enough supporting force to make the optical film 100 form a unidirectional arc along the vertical direction Z. That is, when the first length W0 of the main body 110 is smaller than ⅔ of the second length W1 of the abutting edges 121, it may not be enough supporting force to make the optical film 100 form a unidirectional arc arched state in the vertical direction Z, and the permanent deformation, such as wavy deformation and wrinkle, etc., may occur.

In FIG. 3, the main body 110 of the optical film 100 has a first thickness T1, and the extending portions 120 have a second thickness T2. In one embodiment, the optical film 100 is a uniform thickness (i.e., T1=T2). However, in other embodiments, the second thickness T2 of the extending portions 120 is greater than the first thickness T1 of the main body 110 (i.e., T2>T1), which is beneficial to enhance the structural strength for the abutting edges 121 abutted against the first frame portions 210. The "thickness" described above refers to the length of the main body 110 or the extending portions 120 in the vertical direction Z when the optical film 100 is not in an arched status.

Figure 7:
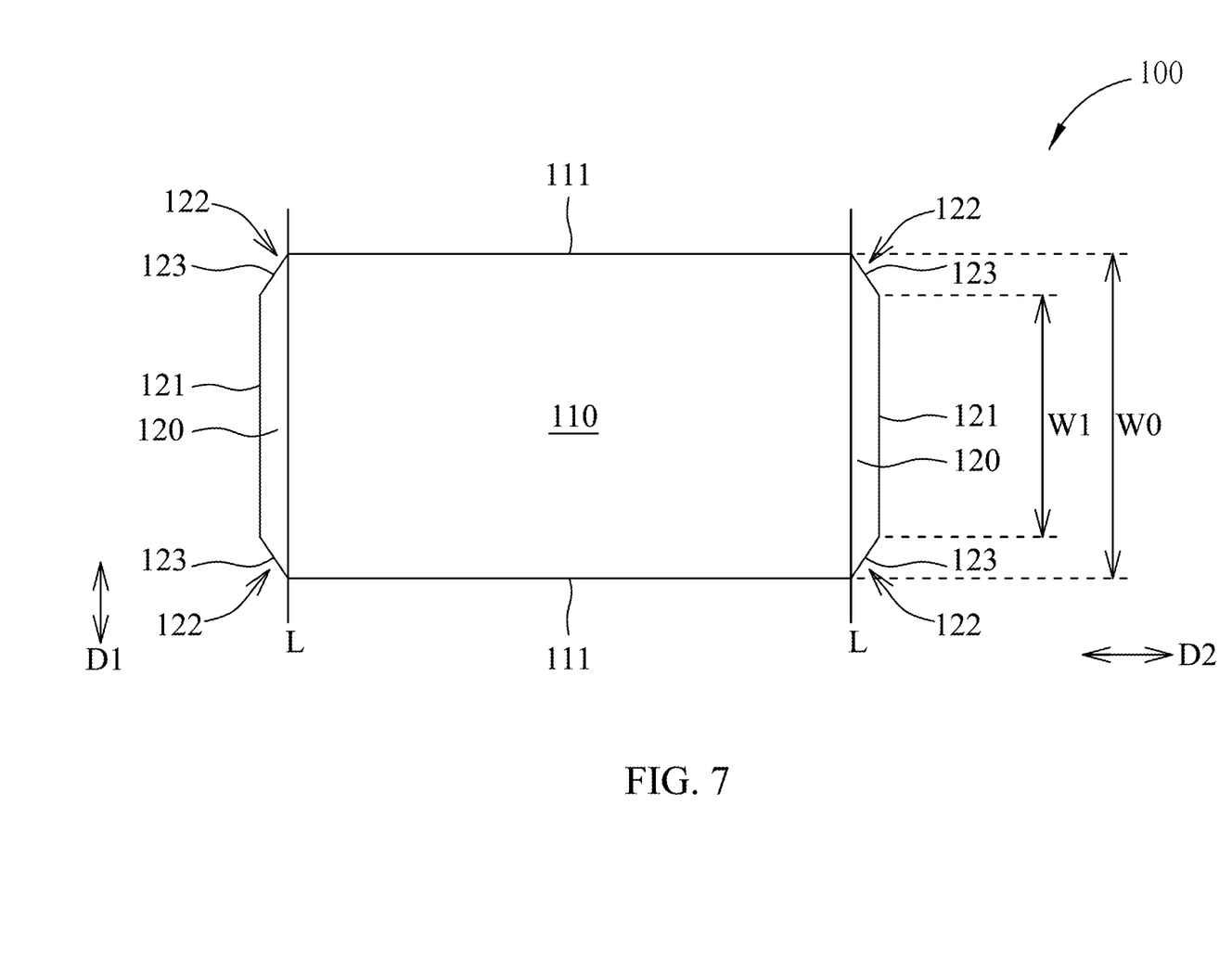
FIG. 7 is a schematic plan view of the optical film shown in FIG. 3.

As shown in FIG. 7, the extending portion 120 of the optical film 100 has two cutaway corner structures 122 relative to the main body 110 in the first direction D1 or/and second direction D2. In the present embodiment, the two cutaway corner structures 122 are respectively disposed on two sides of the abutting edge 121. More specifically, each of the cutaway corner structures 122 has an indented edge 123. The indented edge 123 is connected between an edge of the main body 110 extending in parallel along the second direction D2 and the abutting edge 121 of the extending portion 120, and the indented edge 123 is inclined relative to the abutting edge 121. In the expansion temperature, the abutting edges 121 of the optical film 100 abut against the first surfaces 212 of the first frame portions 210, and the indented edges 123 of the optical film 100 (corresponding to corners of the optical film 100) do not contact the first frame portions 210, such that a central portion of the optical film 100 can be arched in the vertical direction Z. With the arrangement of the cutaway corner structures 122, the permanent deformation, such as wrinkle, etc., on the edges of the optical films 100 extending parallel to the second direction D2 which occurred due to interference between the corners of the optical film 100 and the frame 200 can be prevented.

In one embodiment, as shown in FIG. 3 and FIG. 5, the frame 200 further includes two second frame portions 220 opposite to each other, and each of the second frame portions 220 is connected between the two first frame portions 210.

An area surrounded by the first frame portions 210 and the second frame portions 220 of the frame 200 together defines a hollow area P, wherein the hollow area P corresponds to the expansion space S, and the hollow area P is surrounded by the two first frame portions 210 and the two second frame portions 220. The second frame portion 220 includes second horizontal wall 223 and second vertical wall 224, wherein the second vertical wall 224 is parallel to the vertical direction Z, and the second horizontal wall 223 extends inward from a top of the second vertical wall 224 along the first direction D1. A surface of the second vertical wall 224 of the second frame portion 220 facing the optical film 100 is a second surface 222, and an end of the second horizontal wall 223 of the second frame portion 220, which is located opposite to the second vertical walls 224, is a second end face 221.

Figure 6:
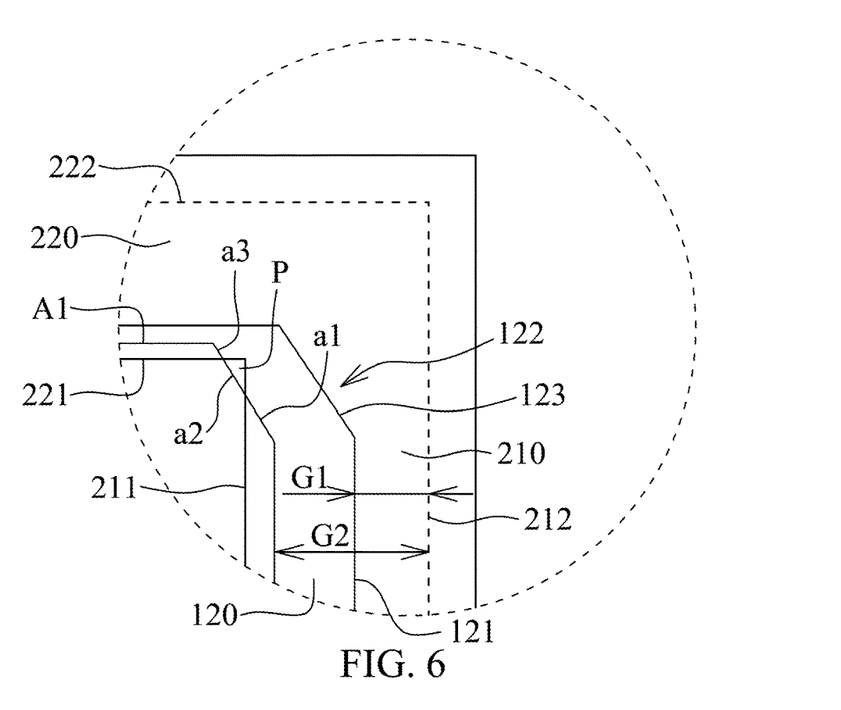
FIG. 6 is a schematic diagram showing a change of the optical film shown in FIG. 5 from the predetermined temperature to a contraction temperature.

Refer to FIG. 6, which is a schematic diagram of a change of the optical film 100 shown in FIG. 5 from the predetermined temperature to a contraction temperature. FIG. 6 corresponds to a part A of FIG. 5. In FIG. 6, a bold line A1 indicates a position state of the optical film 100 relative to the frame 200 in the contraction temperature. In the contraction temperature, there is a second gap G2 between the abutting edge 121 and the first surface 212, the second gap G2 is greater than the first predetermined G1 which exists in the predetermined temperature, and the abutting edges 121 still stay between the first end faces 211 and the first surfaces 212 of the first frame portions 210, and between the second end faces 221 of the second frame portions 220 and the second surfaces 222. More specifically, in the contraction temperature, a portion a1 of the indented edge 123 is located between the first surface 212 and the first end face 211 of the first frame portion 210, another portion a2 is located in the hollow area P, and still another portion a3 is located between the second surface 222 and the second end face 221 of the second frame portion 220. Therefore, the indented edge 123 is simultaneously pressed by the first frame portion 210 and the second frame portion 220, thereby preventing the optical film 100 from jumping out or climbing out of the frame.

Figure 12:
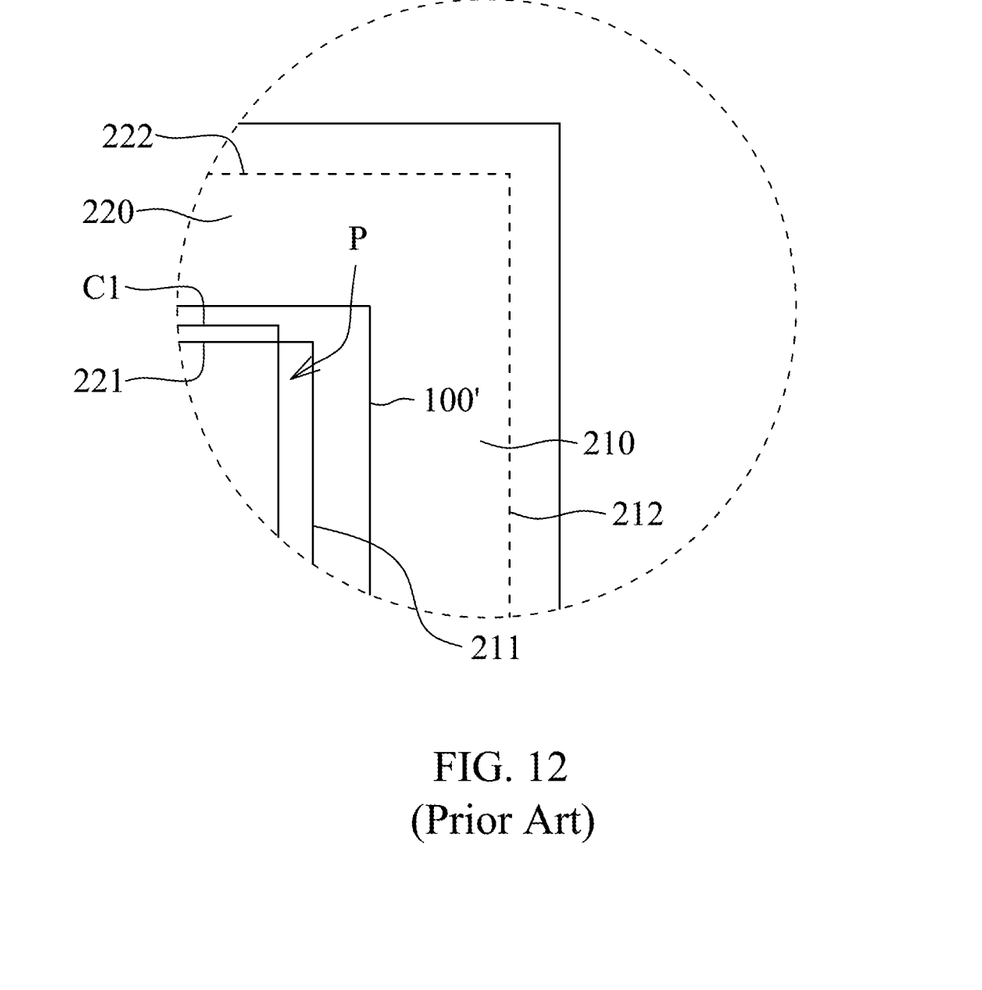
FIG. 12 is a schematic diagram showing a change of an optical film of a prior art from a predetermined temperature to a contraction temperature.

With the extending portions 120, both sides of the optical film 100, such as the left side and the right side, can be pressed by the first frame portions 210 in the contraction temperature, which is beneficial for avoiding the optical film 100 being prone to jumping out or climbing out of the frame when the temperature rising. On the contrary, refer to FIG. 12, which is a schematic diagram showing a change of an optical film 100' of a prior art from a predetermined temperature to a contraction temperature, and FIG. 12 has the same viewing angle as that of FIG. 6, in which a bold line Cl indicates the optical film 100' in the contraction temperature. There are tolerances reserved for manufacturing in an optical film 100' of a prior art. In the predetermined temperature, an edge of right side of the optical film 100' (not labeled) stays in an original location, where between the first end face 211 of the first frame portion 210 and the first surface 212. When the temperature dropping, the optical film 100' contracts, so the edge of the optical film 100' turn into a shrinking location, where is corresponding to the hollow area P. As soon as the temperature rises, the optical film 100' is prone to jumping out or climbing out of the frame.

In one embodiment, as shown in FIG. 5, in the predetermined temperature, the first gap G1 is between the abutting edge 121 and the first frame portion 210, and the main body 110 may completely correspond to the hollow area P, that is, an area of the main body 110 is greater than an area of the hollow area P, and the hollow area P is located within a range covered by the main body 110. Consequently, the main body 110 may be completely covered by the frame 200 to ensure the luminous effect of the backlight module 10 of the present invention applied to the display device 1. In one embodiment, "a portion of the indented edge 123 is located between the first end face 211 and the first surface 212 of the first frame portion 210" means that in the predetermined temperature or the contraction temperature, at least one portion of the indented edge 123 is located within the range covered by the first frame portion 210, that is, the indented edge 123 is partially or fully covered by the first frame portion 210. In this way, it can be ensured that the optical film 100 may not jump out or climb out of the frame after the contraction of the optical film 100.

In FIG. 5, FIG. 6, and FIG. 7, the main body 110 of the optical film 100 further includes two sides 111 opposite to each other, each of the sides 111 is located between the two imaginary lines L, and each of the sides 111 extends along the second direction D2. In the predetermined temperature and the contraction temperature, the sides 111 are completely covered by the frame 200, so as to prevent the sides 111 of the optical film 100 from jumping out or climbing out of the frame.

It should be noted that, in the present embodiment, the two sides 111 of the optical film 100 are longer sides, and the extending portions 120 of the optical film 100 are provided at two sides, such as left side and right side. In this way, the expansion of the optical film 100 occurred along the extending direction of the longer sides, so that the optical film 100 abuts against the frame 200 for preventing the permanent deformation and achieving a narrow frame of the mechanism design purpose at the same time. In other embodiments, the optical film 100 may be provided with the extending portions 120 at two opposite sides, such as the left side and the right side, or the upper side and the lower side, so as to ensure the optical film 100 arched in an arc in the first direction D1 and the second direction D2. Besides, the length of the first horizontal walls 213 of the first frame portions 210 along the second direction D2 and the length of the second horizontal walls 223 of the second frame portions 220 along the first direction D1 can be reduced to achieve a narrow frame of the mechanism design purpose.

In FIG. 3, the first horizontal walls 213 are located on the optical film 100, and the first vertical walls 214 are bent relative to the first horizontal walls 213, and extend from the first horizontal walls 213 towards the optical plate 300 along the vertical direction Z. The first horizontal walls 213 are used to carry the display panel 20, and the hollow area P corresponds to a visual area of the display panel 20. The expansion space S is located between the display panel 20 and the optical film 100, and the height H of the expansion space S is a distance between the display panel 20 and the optical film 100 in the vertical direction Z. Preferably, a maximum height of arching of the optical film 100 along the vertical direction Z is substantially equal to the distance. In this way, the size of the display device 1 in the vertical direction Z can be reduced, which is beneficial to the thinning of the display device 1. In other embodiments, the height H of the expansion space S may also be configured as a distance between the first horizontal walls 213 and the optical film 100 (or the second horizontal walls 223 and the optical film 100) in the vertical direction Z, such that the optical film 100 may not touch the display panel 20 over the first horizontal walls 213 and the second horizontal walls 223 in thermal expansion state, thereby preventing the optical film 100 from contacting the display panel 20 and reducing friction.

Figure 8:
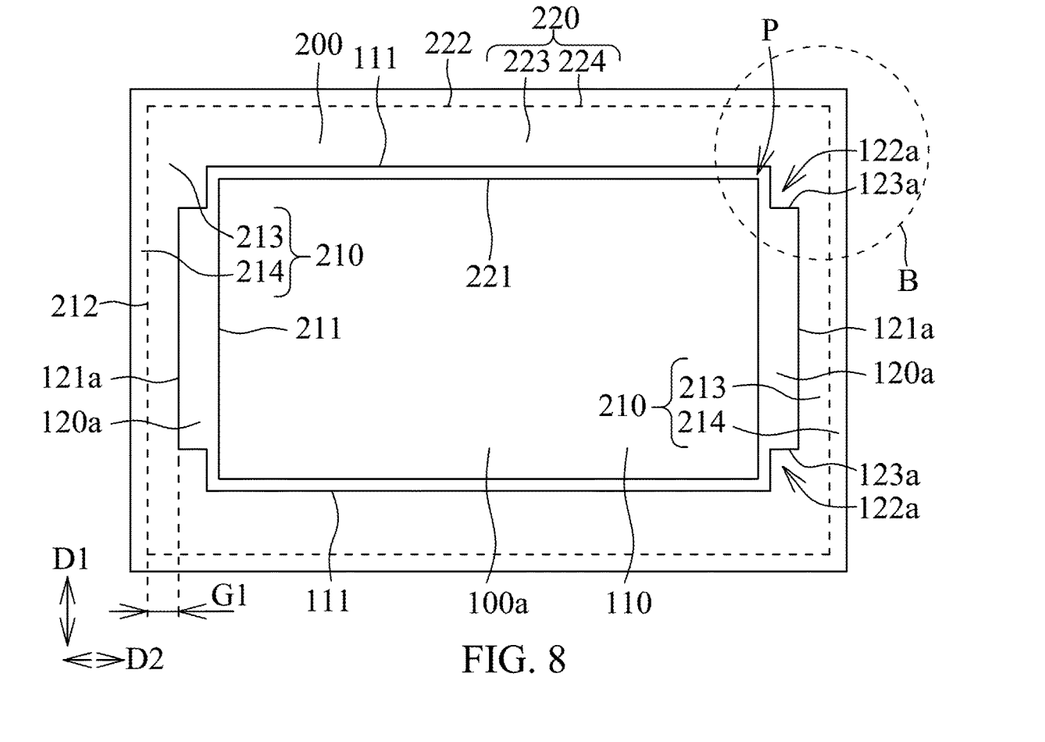
FIG. 8 is a schematic top view of a frame and an optical film in a predetermined temperature according to another embodiment of the present invention.
Figure 9:
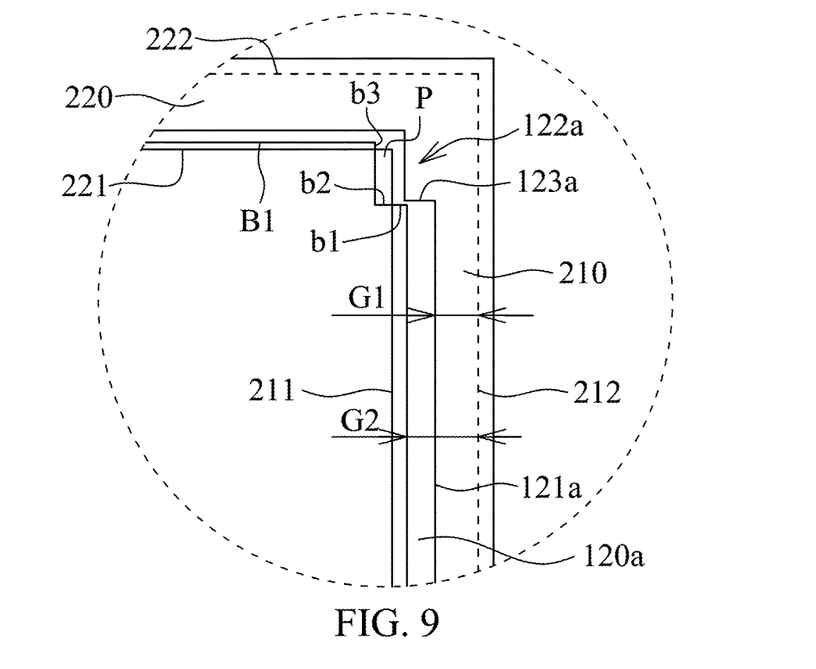
FIG. 9 is a schematic diagram of a change of the optical film shown in FIG. 8 from the predetermined temperature to a contraction temperature.

Refer to FIG. 8, which is a schematic top view of the frame 200 and an optical film 100a in a predetermined temperature according to another embodiment of the present invention. There are differences of the optical film 100a compared to the optical film 100 that cutaway corner structures 122a of extending portions 120a are right angles, and at least one portion of an indented edge 123a is perpendicular to an abutting edge 121a and a side 111. Refer to FIG. 9, which is a schematic diagram of a change of the optical film 100a shown in FIG. 8 from the predetermined temperature to a contraction temperature. FIG. 9 corresponds to a part B of FIG. 8. In FIG. 9, a bold line B1 indicates the optical film 100a in the contraction temperature. In the contraction temperature, a portion b1 of each of the indented edges 123a is located between the first surface 212 and the first end face 211 of the first frame portion 210, another portion b2 is located in the hollow area P, and still another portion b3 is located between the second surface 222 and the second end face 221 of the second frame portion 220. With the portion b1 of the indented edge 123a covered by the first frame portion 210 and the another portion b3 covered by the second frame portion 220, it is avoided that the optical film 100a jumps out or climbs out of the frame when the temperature returns to the predetermined temperature. For other details about the optical film 100a, please refer to the relevant description of the optical film 100.

Figure 10:
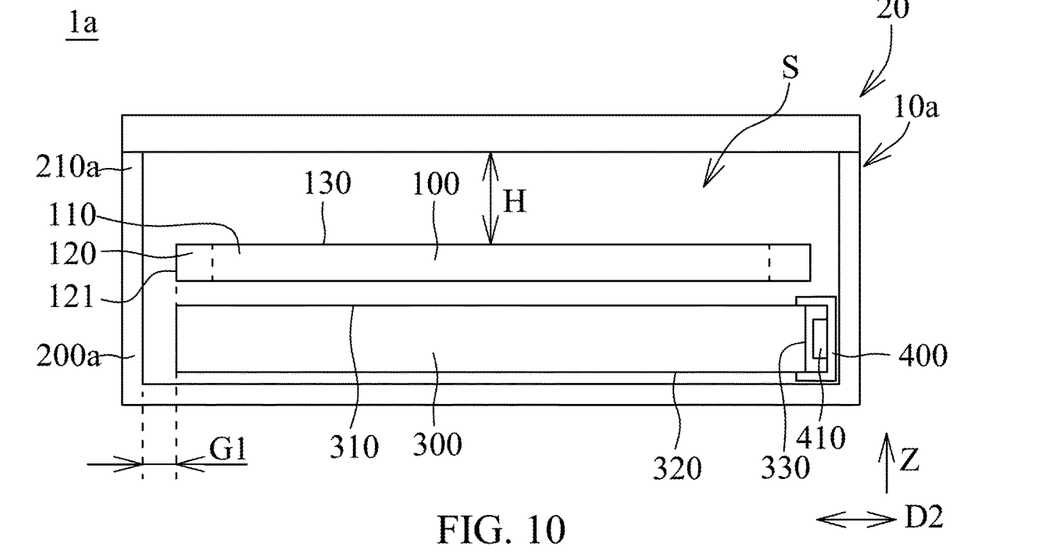
FIG. 10 is a schematic cross-sectional view of a display device in a predetermined temperature according to still another embodiment of the present invention.
Figure 11:
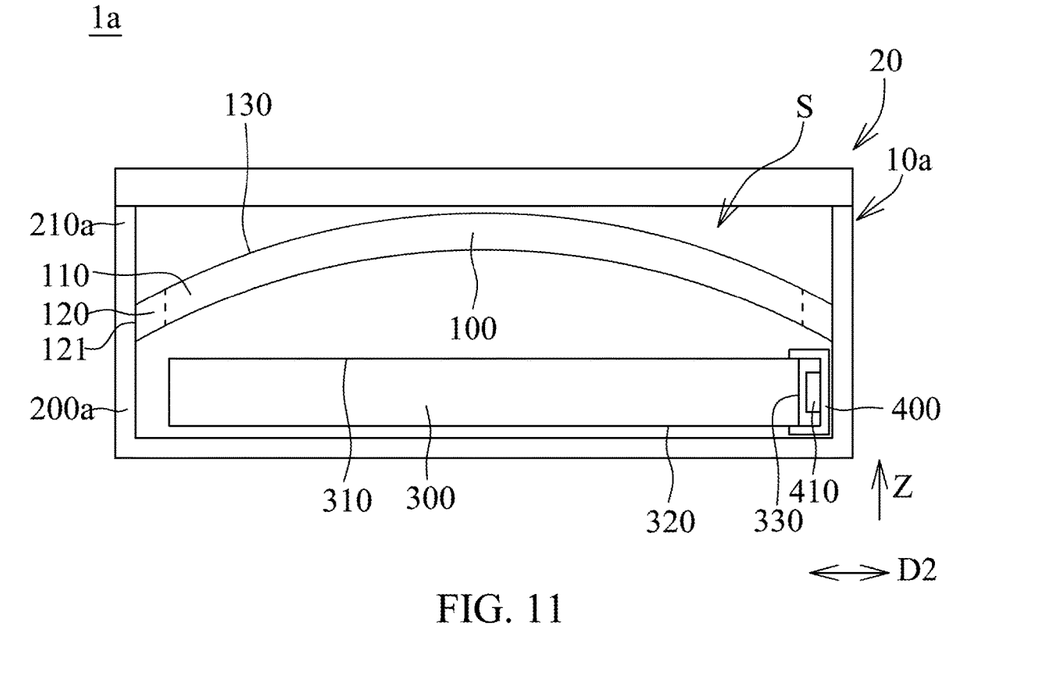
FIG. 11 is a schematic cross-sectional view of the display device shown in FIG. 10 in an expansion temperature.

Refer to FIG. 10 and FIG. 11, FIG. 10 is a schematic cross-sectional view of a display device 1a in a predetermined temperature according to still another embodiment of the present invention, and FIG. 11 is a schematic cross-sectional view of the display device 1a shown in FIG. 10 in an expansion temperature. There are differences of the display device 1a compared to the display device 1 that a frame 200a of a backlight module 10a is a back plate, and a first frame portion 210a is a vertical wall of the back plate. In the present embodiment, the height H of the expansion space S is a distance between the display panel 20 and the optical film 100 in the vertical direction Z. For other details about the display device 1a, please refer to the relevant description of the display device 1.

Compared with the prior art, it provides extending portions on an optical film in the present invention, wherein the length of each abutting edge of the extending portions extending along a first direction is smaller than a length of a main body along the first direction, such that it prevents the optical film from interfering with a frame at corners or jumping out of the frame when contracting, and it is not necessary to increase a width of the frame, which is beneficial to a narrow frame design. On the other hand, the optical film is arched in an arc in a vertical direction by arranging an expansion space, thereby preventing the optical film from permanent deformation, such as wavy deformation or wrinkle, etc., due to the insufficient expansion space.

The aforementioned description is merely preferred embodiments of the present invention, and all equivalent changes and modifications made according to claims of the present invention should be within the scope of the present invention.

What is claimed is:

1. An optical film, and the optical film being divided into a main body and two extending portions arranged along a second direction by two imaginary lines, which are extended along a first direction and are parallel to each other, wherein the second direction is perpendicular to the first direction, the main body is located between the two extending portions, each of the extending portions has an abutting edge, and a first length W0 of the main body along the first direction is greater than a second length W1 of the abutting edge along the first directional; and
    wherein each of the extending portions of the optical film further comprises:
        two cutaway corner structures respectively disposed on two sides of the abutting edge, wherein each of the cutaway corner structures comprises an indented edge, the indented edge directly connects the main body and the abutting edge, and at least one portion of the indented edge is inclined or perpendicular to the abutting edge.

2. The optical film of claim 1, wherein the optical film satisfies a following condition:

$$W1 \geq (2/3)W0.$$

3. The optical film of claim 1, wherein a thickness of each of the extending portions is greater than a thickness of the main body.

4. A backlight module, comprising:
    a frame comprising two first frame portions opposite to each other;
    an optical plate disposed in the frame, wherein the optical plate comprises:
        a light emitting surface;
        a bottom surface opposite to the light emitting surface; and
        a side surface connected between the light emitting surface and the bottom surface;
    a light source disposed on the bottom surface or the side surface of the optical plate; and
    an optical film disposed in the frame and set on the light emitting surface and the optical film being divided into a main body and two extending portions arranged along a second direction by two imaginary lines, which are extended along a first direction and are parallel to each other, wherein the second direction is perpendicular to the first direction, the main body is located between the two extending portions, each of the extending portions has an abutting edge, and a first length W0 of the main body along the first direction is greater than a second length W1 of the abutting edge along the first direction; and
    wherein each of the extending portions of the optical film further comprises two cutaway corner structures respectively disposed on two sides of the abutting edge;
    wherein the frame is used to carry a display panel, the frame defines a hollow area, and the hollow area corresponds to a visual area of the display panel;
    in a first temperature, the main body corresponds to the hollow area, and each of the cutaway corner structures is located beyond the hollow area; and
    in a second temperature, at least one portion of each of the cutaway corner structures is located in the hollow area, and at least another one portion of each of the cutaway corner structures is pressed by the frame.

5. The backlight module of claim 4, wherein
    each of the cutaway corner structures comprises an indented edge, the indented edge is connected between the main body and the abutting edge, and at least one portion of the indented edge is inclined or perpendicular to the abutting edge.

6. The backlight module of claim 5, wherein:
    each of the first frame portions comprises a first vertical wall and a first horizontal wall connected to each other, the first vertical wall has a first surface facing the optical film, the first horizontal wall extends inward form a top of the first vertical wall, and the first horizontal wall has a first end face opposite to a side which is connected to the first vertical wall;

in the first temperature, each of the abutting edges is located between the first surface and the first end face of the first frame portion, and there is a first gap between the abutting edge and the first surface; and in the second temperature which is lower than the first temperature, each of the abutting edges still stays between the first surface and the first end face of the first frame portion, there is a second gap between the abutting edge and the first surface, and the second gap is greater than the first gap.

7. The backlight module of claim 6, wherein:

in the first temperature, a portion of the indented edge of each of the cutaway corner structures is located between the first surface and the first end face of the first frame portion; and in the second temperature, at least one portion of the indented edge of each of the cutaway corner structures is located in the hollow area, and at least another one portion of the indented edge of each of the cutaway corner structures is located between the first surface and the first end face of the first frame portion.

8. The backlight module of claim 7, wherein:

the frame further comprises two second frame portions opposite to each other, each of the second frame portions is connected between the two first frame portions, and each of the second frame portions comprises a second surface and a second end face opposite to each other; and in the second temperature, the said at least one portion of the indented edge of each of the cutaway corner structures is located in the hollow area, the said at least another one portion of the indented edge of each of the cutaway corner structures is located between the first surface and the first end face of the first frame portions, and still another portion of the indented edge of each of the cutaway corner structures is located between the second surface and the second end face of the second frame portion.

9. The backlight module of claim 4, wherein:

an expansion space is above the optical film, the expansion space has a height along a vertical direction; and in a third temperature which is higher than the first temperature, each of the abutting edges abuts against one of the first frame portions, and the height of the expansion space is configured to allow the optical film to be arched in an arc along the vertical direction.

10. A display device, comprising:
the backlight module of claim 4; and
a display panel disposed over the backlight module.

11. A backlight module, comprising:

a frame comprising two first frame portions opposite to each other, wherein each of the first frame portions extends along a first direction;

an optical plate disposed in the frame, and the optical plate comprising:
 a light emitting surface;
 a bottom surface opposite to the light emitting surface; and
 a side surface connected between the light emitting surface and the bottom surface;

a light source disposed on the bottom surface or the side surface of optical plate; and an optical film disposed in the frame and set on the light emitting surface, and the optical film comprising two abutting edges extending along the first direction and parallel to each other;

wherein there is an expansion space above the optical film, and the expansion space has a height along a vertical direction; and in an expansion temperature, each of the abutting edges abuts against one of the first frame portions, and the height of the expansion space is configured to allow the optical film to be arched in an arc along the vertical direction.

12. A display device, comprising:
the backlight module of claim 11; and
a display panel disposed over the backlight module;
wherein the expansion space is located between the display panel and the optical film, and the height of the expansion space is a distance between the display panel and the optical film in the vertical direction.

13. The display device of claim 12, wherein a maximum height of the optical film arched along the vertical direction is equal to the distance.

14. A backlight module, comprising:

a frame comprising two first frame portions opposite to each other;

an optical plate disposed in the frame, wherein the optical plate comprises:
 a light emitting surface;
 a bottom surface opposite to the light emitting surface; and
 a side surface connected between the light emitting surface and the bottom surface;

a light source disposed on the bottom surface or the side surface of the optical plate; and the optical film of claim 1 disposed in the frame and set on the light emitting surface.

15. A display device, comprising:
the backlight module of claim 14; and
a display panel disposed over the backlight module.

* * * * *